United States Patent [19]

Okamoto et al.

[11] Patent Number: 5,767,396
[45] Date of Patent: Jun. 16, 1998

[54] METHOD AND DEVICE FOR MEASURING FUEL INJECTION TIMING

[75] Inventors: Ryuji Okamoto; Tetsuji Sato, both of Toyota; Kazumi Umeki, Gotenba; Takeshi Takahashi, Shizuoka; Naoyuki Tsuzuki, Anjo; Shunsuke Yasunishi, Susono; Koji Kitano, Susono; Takashi Yamamoto, Susono, all of Japan

[73] Assignee: Toyota Techno Service Corp., Toyota, Japan

[21] Appl. No.: 814,028

[22] Filed: Mar. 10, 1997

Related U.S. Application Data

[63] Continuation of Ser. No. 498,768, Jul. 6, 1995, abandoned.

[30] Foreign Application Priority Data

Sep. 14, 1994 [JP] Japan .................................. 6-220107
May 12, 1995 [JP] Japan .................................. 7-114811

[51] Int. Cl.[6] ........................................... G01M 15/00
[52] U.S. Cl. ........................................... 73/119 A
[58] Field of Search ........................... 73/113, 119 A, 73/1.42, 117.2, 117.3, 119 R

[56] References Cited

U.S. PATENT DOCUMENTS

| | | | |
|---|---|---|---|
| 4,413,508 | 11/1983 | Kawamura et al. | 73/119 A |
| 4,502,438 | 3/1985 | Yasuhara | 73/119 A |
| 4,573,347 | 3/1986 | Sekiguchi et al. | 73/119 A |
| 4,656,990 | 4/1987 | Miyaki et al. | 73/119 A |
| 4,658,642 | 4/1987 | Ikeda | 73/119 A |
| 4,713,965 | 12/1987 | Kobayashi | 73/119 A |
| 5,000,042 | 3/1991 | Luebbering | 73/119 A |
| 5,063,903 | 11/1991 | Wahl et al. | 73/119 A |
| 5,103,668 | 4/1992 | Drutel et al. | 73/119 A |
| 5,197,439 | 3/1993 | Gronenberg et al. | |

FOREIGN PATENT DOCUMENTS

| | | |
|---|---|---|
| 4-237845 | 8/1992 | Japan . |
| 4-284163 | 10/1992 | Japan . |
| 5-1640 | 1/1993 | Japan . |
| 5-99100 | 4/1993 | Japan . |
| 5-332184 | 12/1993 | Japan . |

*Primary Examiner*—Richard Chilcot
*Assistant Examiner*—Eric S. McCall
*Attorney, Agent, or Firm*—Oliff & Berridge, PLC

[57] ABSTRACT

An injection timing measuring method and device require a reduced amount of time for calculation. A reference position signal is generated at a predetermined crank angle within the range of 30° CA to 90° CA prior to TDC. Crank angle signals from a crank angle sensor are used as main measuring increments to measure a period starting from generation of the reference position signal and ending upon generation of an injection signal by a lift sensor provided in an injection valve unit, and another period starting from generation of the reference position signal and ending upon generation of a TDC signal. The injection timing relative to the TDC is provided as a difference between the two periods. Each period is precisely measured by counting crank angle signals generated within the period and by determining the remaining duration from the last-counted signal to generation of the injection or TDC signal as a fraction of the crank angle signal interval. Measurement of the injection period starts from an injection start time at which the level of the injection signal exceeds a criterion value, and ends upon an injection end time at which the level falls below the criterion value.

18 Claims, 16 Drawing Sheets

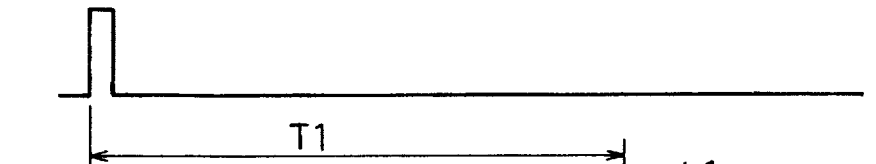
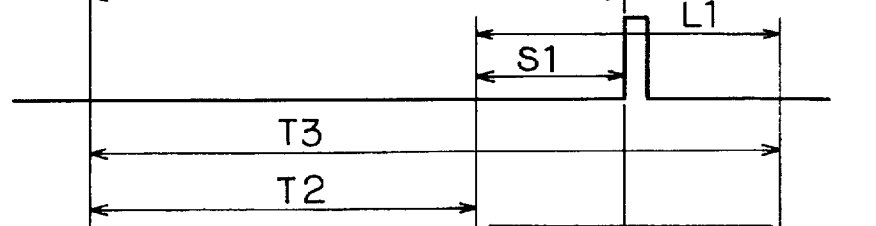
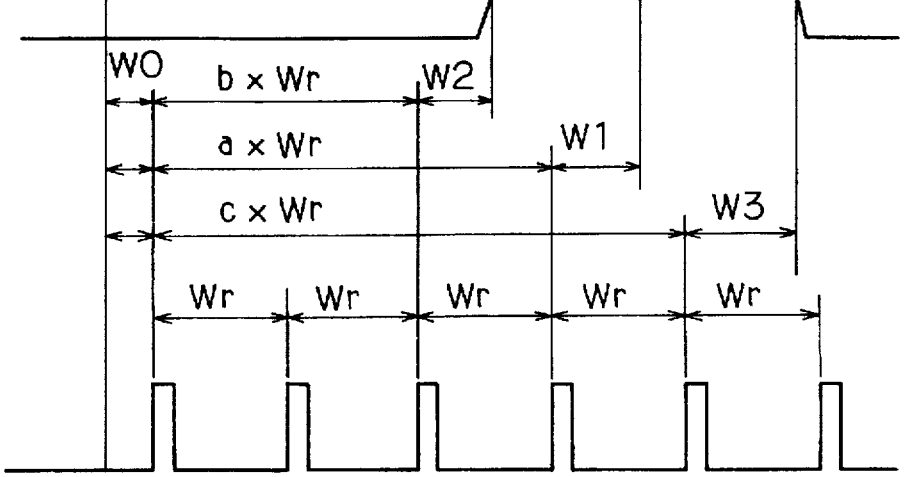

5,767,396

1

METHOD AND DEVICE FOR MEASURING FUEL INJECTION TIMING

This is a continuation of application Ser. No. 08/498,768 filed Jul. 6, 1995, now abandoned.

BACKGROUND OF THE INVENTION

1. Field of the Invention

The present invention relates to a method and a device for measuring or determining timing for injecting fuel into a cylinder of an internal combustion engine.

2. Description of Related Art

Fuel injection timing affects engine power and concentrations of emission substances. Various methods and devices have been disclosed relating to measurement or determination of fuel injection timing and/or adjustment of the measured injection timing to a target timing. Many of such methods and devices are provided for use in diesel engines, which heavily rely on the fuel injection timing. For example, Japanese Laid-Open Patent Application No. HEI 5-99100 discloses a device comprising a cylinder pressure sensor, an injection start sensor and a crank angle sensor. The device determines the top dead center position of the piston (hereinafter, referred to as "TDC") based on the peak timing in the pressure inside the cylinder. The device also determines the actual injection start timing in terms of crank angle from the TDC based on the determined TDC, the output from the injection start sensor and the output from the crank angle sensor, and adjusts the actual injection start timing to a target timing.

Japanese Laid-Open Patent Application No. HEI 4-237845 discloses a device comprising a TDC sensor, a vibration acceleration sensor and a crank angle sensor. The device determines TDC using the TDC sensor, determines the actual injection start timing in terms of crank angle from the TDC based on the output from the vibration acceleration sensor and the output from the crank angle sensor, and adjusts the actual injection start timing to a target timing.

Recent stringent emission regulations necessitate fine and precise fuel injection control. Accordingly, more precise determination or measurement of the injection timing is required to achieve precise injection control. Furthermore, high precision timing measurement requires a test apparatus used for development of a precise injection control method and device. Such precision enhancement normally requires an increased amount of operation or calculation to be performed for determining the injection timing and therefore requires high-speed processing of operations.

Although the above-mentioned document (No. HEI 5-99100) does not clearly describe the operation for measuring the injection start timing, the device apparently starts counting crank angle signal pulses from the crank angle sensor when receiving a signal pulse from the injection start sensor, reads out the counting of the crank angle signal pulses when receiving a TDC signal pulse from the cylinder pressure sensor, and thereby determines the current injection start timing in terms of crank angle relative to the TDC. However, the injection start timing relative to the TDC significantly varies depending on the characteristics and running conditions of engines. In some cases, the CPU receives a TDC signal pulse from the cylinder pressure sensor before receiving a start signal pulse from the injection start sensor. In other cases, the CPU receives those signal pulses in the reverse order. If a device uses the first arriving signal pulse as a signal to start to count signal pulses from the crank angle sensor, the device needs to employ a logic for determining whether the counting start signal is a TDC signal pulse from the cylinder pressure sensor or an injection start signal pulse from the injection start sensor. Thus, the operation becomes complicated and requires extensive processing time.

Alternatively, it can be conceived that instead of using a determination logic as described above, a counter counts crank angle signal pulses during a period from reception of a TDC signal pulse to reception of a signal pulse outputted by the injection start sensor in the following cycle. In this method, the duration of monitoring the crank angle may be increased to at least a 540° crank angle, during which the CPU cannot perform other operations.

The device disclosed in the above document (No. HEI 4-237845) suffers from similar problems.

SUMMARY OF THE INVENTION

It is an object of the present invention to provide fuel injection timing measuring method and device suitable for high speed processing.

According to a first aspect of the present invention, there is provided an injection timing measuring method. A first period is measured starting when generating a reference position signal at a predetermined timing prior to starting of fuel injection from an injection valve provided in an engine, and ending when generation of an injection signal is generated in response to the fuel injection from the injection valve based on a crank angle signal, for example, by using crank angle signals as a scale. The reference position signal corresponds to a reference position on a crank shaft. A second period is measured from the generation of the reference position signal to a top dead center position based on the crank angle signal. An injection timing is determined relative to top dead center based on the first period and the second period.

According to a second aspect of the present invention, there is provided an injection timing measuring device comprising components for generating various signals and for calculating a fuel injection timing. A crank angle signal generating module generates a crank angle signal every increment of a predetermined crank angle that indicates a rotational angle of a crank shaft. A reference position signal generating module generates a reference position signal at a predetermined timing prior to fuel injection from an injection valve provided in an engine. The reference position signal corresponds to a reference position assumed or defined on a crank shaft. An injection signal generating module generates an injection signal when the injection valve injects fuel. A top dead center signal generating module generates a top dead center signal when a piston reaches a top dead center. A fuel injection timing calculating module calculates a fuel injection timing relative to top dead center based on a first period from generation of the reference position signal to generation of the injection signal and a second period from generation of the reference position signal to generation of the top dead center signal. The first and second periods are measured based on the crank angle signal, for example, by using crank angle signal pulses as measuring increments.

In the construction according to the second aspect, the reference position on the crank shaft may be assumed within a range of 30° CA to 90° CA advanced from the top dead center.

In the construction according to the second aspect, the level of the injection signal may vary in accordance with opening of the injection valve, and an injection period may be measured from an injection start timing at which the level of an injection signal exceeds a predetermined criterion to an injection end timing at which the level of the injection signal falls below the predetermined criterion.

In the construction according to the second aspect, the measurement of the first and second periods may be started at generation of a crank angle signal immediately following the generation of the reference position signal.

In the construction according to the second aspect, the first and second periods may be measured by counting crank angle signal pulses and determining a fraction of one crank angle signal pulse, the fraction being determined in terms of proportion to a length of at least one pulse interval. Further, the proportion may be determined based on a first count provided during at least one pulse interval by a counter that is started by a crank angle signal pulse and a second count provided by the counter during the period of the fractional pulse.

In the construction according to the second aspect, if rotational speed of the crank shaft exceeds a predetermined value, the number of crank angle signals counted per rotation of the shaft may be reduced to half by, for example, a half-frequency divider, so that a half-reduced value is used for the calculation performed by the injection timing calculating module or component.

In the construction according to the second aspect, an injection period may be measured a plurality of times during one rotation of the crank shaft to determine the greatest measurement of a plurality of measurements as a main injection period. Further, an injection period measurement obtained before the greatest measurement may be determined as a pilot injection period, and an injection period measurement obtained after the greatest measurement may be determined as a secondary injection period.

Optionally, a plurality of criteria may be used to determine the level of the injection signal so as to follow changes in opening of the injection valve over time.

The predetermined criterion for determining an event of fuel injection may be corrected based on a difference between a zero level and a peak level of the injection signal. If the level of the injection signal continues to be not lower than the corrected criterion or not shorter than a predetermined length of time, it may be determined that a peak level has occurred.

Further, if the level of an injection signal pulse continues to be higher than the criterion for not shorter than a length of time determined according to the peak level of the injection signal pulse, it may be determined that the injection valve has opened.

BRIEF DESCRIPTION OF THE DRAWINGS

Further objects, features and advantages of the present invention will become apparent from or are described in the following description of the preferred embodiments with reference to the attached drawings, wherein:

FIGS. 2(A)-(E) illustrate operation according to Embodiment 1;

DETAILED DESCRIPTION OF PREFERRED EMBODIMENTS

Preferred embodiments of the present invention will be described hereinafter with reference to the accompanying drawings.

Embodiment 1

Embodiment 1 of the invention is provided as a test apparatus for use in a laboratory for research and development.

Figure 1:
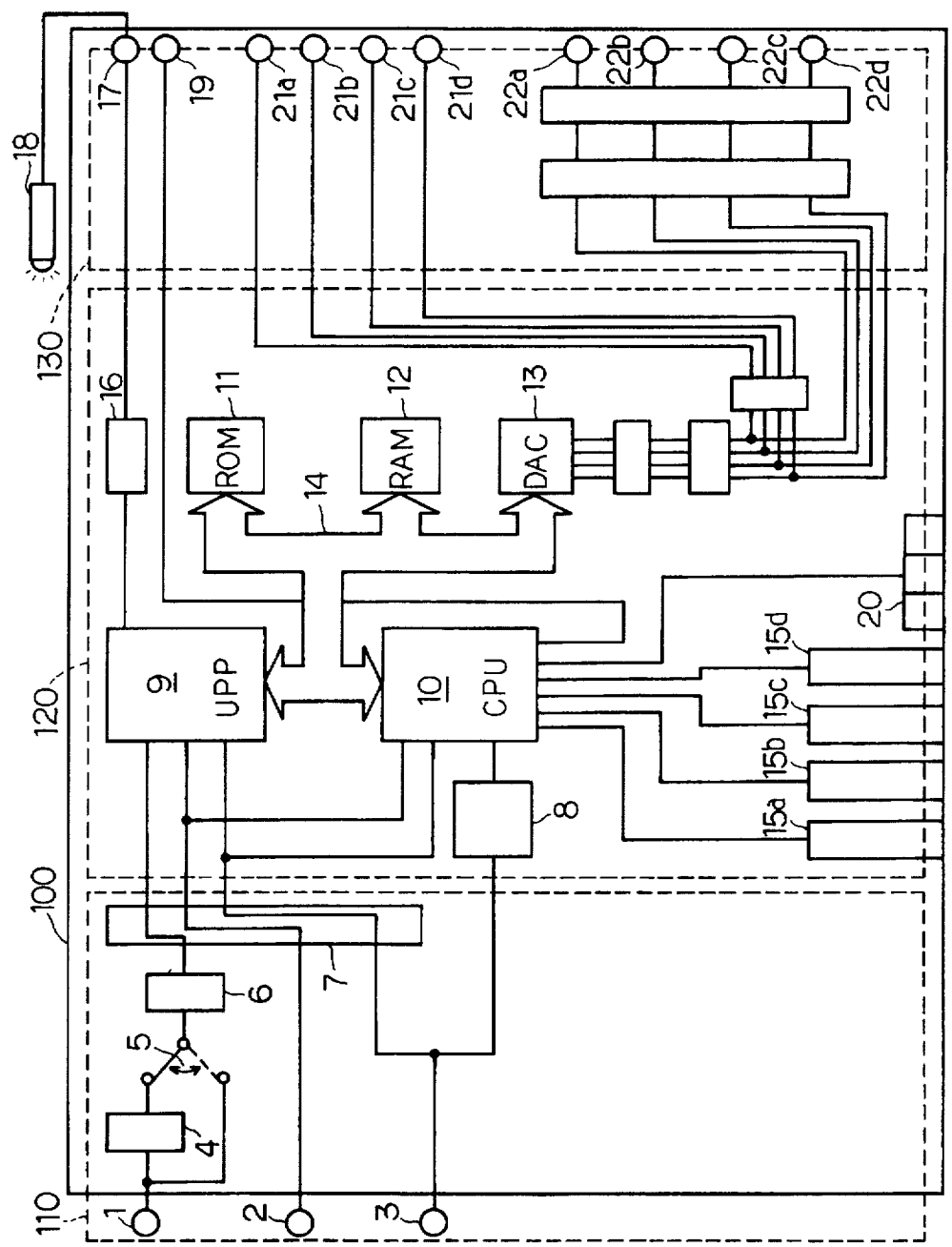
FIG. 1 illustrates the construction of Embodiment 1 of the present invention.

Referring to FIG. 1, a fuel injection timing measuring device comprises a detection section 110, a calculation section 120 and a display/output section 130, which are enclosed in broken-line boxes in the drawing. As indicated by a major solid-line box, a fuel injection timing monitor 100 contains the calculation section 120, the display/output section 130, and the detection section 110 (excluding a lift sensor 1, a reference position sensor 2 and a crank angle sensor 3).

The lift sensor 1 in the detection section 110 is incorporated in a fuel injection valve (not shown). The lift sensor 1 detects the lift of a needle valve that adjusts the amount of fuel to be injected, and outputs an injection signal pulse NL. (A signal pulse may also encompass a mere "signal".) The lift sensor 1 thus serves as means for generating an injection timing signal. The reference position sensor 2 detects a reference position predetermined within a range of 30° CA to 90° CA (crank angle) advanced from TDC and accordingly outputs a reference position signal RS upon every rotation of the crank shaft (not shown), and outputs the corresponding signal. The reference position sensor 2 thus serves as means for generating a reference position signal. The crank angle sensor 3 detects crank angle signals WC that are generated a predetermined number of times (according to this embodiment, 360 times) during rotation of the crank shaft, and outputs the corresponding signal pulses WC. The crank angle sensor 3 serves as means for generating a crank angle signal.

The injection signal NL is transmitted from the lift sensor 1 to the fuel timing monitor 100 via an internal converter 4 if the transmission distance is small. If the transmission distance is great, the signal is transferred by an external converter (not shown) provided near the lift sensor 1. A change-over switch 5 is provided for changing over the two transmission lines. A scaling amplifier 6 amplifies, filters and offsets the injection signal NL. A buffer amplifier 7 shapes the waveform of the injection signal NL processed by the scaling amplifier 6, and the waveforms of the reference position signal RS and the crank angle signal WC, and then transmits those signals to the calculation section 120. More specifically, the injection signal NL is inputted to a UPP (universal pulse processor) 9, and the reference position signal RS and the crank angle signal WC are inputted to the UPP 9 and a CPU 10. The crank angle signal WC is also transmitted via a bypass around the buffer amplifier 7, along which the crank angle signal WC is half-frequency processed and waveform-shaped by a frequency divider 8 before being inputted to the CPU 10.

The calculation section 120 comprises a ROM 11, a RAM 12 and a DAC (digital-to-analog converter) 13, in addition to the frequency divider 8, the UPP 9 and the CPU 10. These units are interconnected by a data bus 14 to process input signals.

A teeth setting unit 15a sets the number of teeth provided on a disc that rotates synchronously with the crank shaft for cooperating with the electromagnetic crank angle sensor 3 to generate crank angle signal pulses WC. In other words, the teeth setting unit 15a sets the number of crank angle signal pulses generated per rotation of the crank shaft. A TDC setting unit 15b shifts the reference position signal RS to provide a TDC signal. More specifically, the amount of shift is determined by setting the TDC setting unit 15b. A valve open/close (or injection) determining criterion setting unit 15c sets a criterion value for determining whether the injection valve is open. A shift TDC (hereinafter, referred to as "the STDC") setting unit 15d sets a position shifted a given angle from the actual TDC and the valve opening timing is determined to be advanced or delayed relative to the shifted position. These setting units are connected to the CPU 10.

The UPP 9 has a programmable pulse processing function to support and perform part of the software processing of the CPU 10, thereby preventing speed reduction of the processing of the CPU 10 that may be caused by realtime signal processing. The UPP 9 performs various types of pulse processing. For example, the UPP 9 starts to count crank angle signal pulses WC when receiving a reference position signal pulse RS, activates a timer when counting a predetermined number of crank angle signal pulses WC, and outputs a TDC signal pulse when the timer expires after a preset time (shorter than the pulse interval of crank angle signal WC, that is, the duration per pulse cycle WC). The TDC signal is converted by a pulse amplifier 16 to a voltage signal of a predetermined level, for example, 12 V. The voltage signal is transmitted to a TDC signal output terminal 17 provided in the display/output section 130 to drive a timing light 18 connected to the TDC signal output terminal 17.

Although the unit including the reference position sensor 2 is preset to generate a signal pulse at a certain crank angle prior to the actual TDC, the crank angle of a signal generation timing may vary from one unit to another. Therefore, it is necessary to accurately measure the timing of generating the reference position signal for individual engines. Accordingly, the timing light 18 is driven by a TDC signal output provided by shifting (delaying) the reference position signal RS. The setting of the TDC setting unit 15b is then adjusted to provide a TDC signal such that the timing light 18 is turned on exactly when the TDC position is reached, with reference to a TDC marking provided on the engine crank shaft. The thus-obtained setting of the TDC setting unit 15b indicates that the TDC is set by the TDC setting unit 15b, in terms of crank angle, prior to the reference position signal RS. Thus, the TDC marking on the crank shaft provides a basis for generation of the TDC signal. The reference position signal RS is shifted (delayed) to synchronize the timing light 18 with the TDC marking, which serves as means for generating the TDC signal.

The CPU 10 performs various operations using the reference position signal RS and crank angle signal WC (obtained directly or through pulse-processing by the UPP 9), and further using the injection signal (valve open/close signal) NL from the lift sensor 1, all of which signals have been analog-to-digital converted.

For example, the CPU 10 compares the valve opening timing monitored by means of the injection signal NL with the TDC position, and outputs a result of the determination of whether the injection timing is before or after the TDC. This result can be outputted through an output terminal 19 provided in the display/output section 130.

The CPU 10 also calculates a main injection start timing, a main injection period, a pilot injection start timing and a pilot injection period based on the reference position signal RS, the crank angle signal WC and the injection signal NL. The calculation results are transmitted via the DAC 13, an amplifier (unshown) and a filter (unshown) to terminals 21a, 21b, 21c, 21d or indicators 22a, 22b, 22c, 22d, which are provided in the display/output section 130.

The calculation section 120 comprises LEDs (light emitting diodes) 20 for indicating the current conditions of the power source, occurrence of errors, or whether, when the STDC is used, the injection valve opening timing is earlier or later than the STDC.

As mentioned above, the display/output section 130 comprises various output terminals and indicators. The TDC signal output terminal 17 is provided for outputting the TDC signal. The output terminal 19 is provided for outputting the result of the determination of whether the valve opening timing is earlier or later than the TDC. The terminals 21a, 21b, 21c, 21d are provided for outputting, in the form of voltage signals, the main injection start timing, the main injection period, the pilot injection start timing and the pilot injection period. Thus, all such information can be recorded by connecting a recorder or memory (not shown) to these terminals. The indicators 22a, 22b, 22c, 22d include digital voltmeters that indicate the main injection start timing, the main injection period, the pilot injection start timing and the pilot injection period. The display/output section 130 further comprises a filter and an amplifier (not shown) for processing the information signals transmitted to the indicators 22a, 22b, 22c, 22d.

According to the invention, the lift sensor 1 for detecting the lift of the fuel injection valve to determine an event of fuel injection may be of various types. For example, a known variable inductance-type sensor is disclosed in "Journal of the Society of Automotive Engineers of Japan" Vol. 40, No. 2 (1986). An eddy current-type sensor or a sensor employing a Hall element may also be used.

The basic concept of the calculation to obtain an injection timing and an injection period according to Embodiment 1 will be explained with reference to FIGS. 2(A)–(E). FIG. 2(A) indicates the reference position signal RS; FIG. 2(B) indicates the TDC signal; FIG. 2(C) indicates the injection signal NL; FIG. 2(D) indicates the crank angle signal WC; and FIG. 2(E) shows operation loops for measuring various periods, explained below.

The final values to obtain are a timing value S1 and a period L1. The timing value S1 occurs at a time at which the level of the injection signal NL exceeds an injection criterion, relative to the TDC and, more precisely, relative to the rising of a TDC signal pulse.

The period L1 is a period from the timing S1 to a timing at which the level of the injection signal NL becomes less than the criterion. It should be understood that "timing", "period" or the like is provided in terms of, for example, crank angle.

The timing S1 and the period L1 are expressed as follows:

$$S1 = T2 - T1 \tag{1}$$

$$L1 = T3 - T2 \tag{2}$$

where: T1 is a period from the rising of a reference position signal pulse RS to the rising of the TDC signal pulse immediately following that reference position signal pulse RS;

T2 is a period from the rising of the reference position signal pulse RS to the timing at which the level of the immediately following injection signal pulse NL exceeds the injection criterion; and T3 is a period from the rising of the reference position signal pulse RS to the timing at which the level of the immediately following injection signal pulse becomes less than the injection criterion.

T1 can also be expressed as follows:

$$T1 = W0 + (a \times Wr) + W1 \tag{3}$$

where: W0 is a period from the rising of the reference position signal pulse RS to the rising of the crank angle signal pulse WC immediately following the rising of that crank angle signal pulse WC;

Wr is a pulse interval of crank angle signal WC;

a is the number of crank angle signal pulses WC (FIG. 2(D)) rising within the period from the rising of the reference position signal pulse RS to the rising of the TDC signal pulse; and W1 is a period from the rising of the crank angle signal pulse immediately preceding the rising of the TDC signal pulse to that TDC signal pulse rising.

Similarly, T2 can be expressed as follows:

$$T2 = W0 + (b \times Wr) + W2 \tag{4}$$

where:

W0 is the period as defined above;

Wr is the pulse interval as defined above;

b is the number of crank angle signal pulses WC rising within the period from the rising of the reference position signal pulse RS to the timing at which the level of the immediately following injection signal pulse NL exceeds the injection criterion; and W2 is a period from the rising of the crank angle signal pulse WC immediately preceding the timing at which the level of the injection signal pulse NL exceeds the injection criterion to that timing.

Similarly, T3 can be expressed as follows:

$$T3 = W0 + (c \times Wr) + W3 \tag{5}$$

where:

W0 is the period as defined above;

Wr is the pulse interval as defined above;

c is the number of crank angle signal pulses WC rising within the period from the rising of the reference position signal pulse RS to the timing at which the level of the immediately following injection signal pulse NL becomes less than the injection criterion; and W3 is a period from the rising of the crank angle signal pulse WC immediately preceding the timing at which the level of the injection signal pulse NL becomes less than the injection criterion to that timing.

Formulas (1) and (2) can be rewritten by using formulas (3), (4) and (5) as follows:

$$\begin{aligned} S1 &= T2 - T1 = W0 + (b \times Wr) + W2 - (W0 + (a \times Wr) + W1) \\ &= ((b-a) \times Wr) + W2 - W1 \end{aligned} \tag{6}$$

$$\begin{aligned} L1 &= T3 - T2 = W0 + (c \times Wr) + W3 - (W0 + (b \times Wr) + W2) \\ &= ((c-b) \times Wr) + W3 - W2 \end{aligned} \tag{7}$$

Since W0 is thus canceled, there is no need to measure W0. Accordingly, measurement can be started at the rising of a crank angle signal pulse WC immediately following a. TDC signal pulse.

Therefore, it is unnecessary to synchronize the rising of the reference position signal pulse RS with the rising of a crank angle signal pulse WC. Accordingly, mounting of the reference position sensor 2 for generating reference position signal pulses RS does not require high precision.

Periods W0, W1, W2 and W3 are measured by using operation loops for measurement as indicated by FIG. 2(E).

First, the number of loops performed during those periods and also Wr, that is, the pulse interval of crank angle signal WC, are counted.

The pulse interval Wr can also be determined from the number of teeth provided for the crank angle sensor 2. For example, if the number of teeth is 360, then Wr is obtained in terms of crank angle as 360° CA/360 = 1° CA.

If the number of loops counted during the pulse interval Wr is 20 and the number of loops counted during the periods W0, W1, W2 and W3 are 6, 14, 12 and 16, respectively, then W0, W1, W2 and W3 are obtained as follows:

$$W0 = 1° \ CA \times 6/20 = 0.3° \ CA$$

$$W1 = 1° \ CA \times 14/20 = 0.7° \ CA$$

$$W2 = 1° \ CA \times 12/20 = 0.6° \ CA$$

$$W3 = 1° \ CA \times 16/20 = 0.8° \ CA$$

If the numbers a, b, c of pulses rising during respective periods are: a=90, b=60, c=120, then the timing S1 and the period L1 are obtained as follows:

$$\begin{aligned} S1 &= (b-a) \times Wr + W2 - W1 \\ &= (60-90) \times 1 + 0.6 - 0.7 \\ &= -30.1° \ CA \\ &= 30.1° \ CA(BTDC: \text{backward from } TDC) \\ L1 &= (c-b) \times Wr + W3 - W2 \\ &= (120-60) \times 1 + 0.8 - 0.6 \\ &= 60.2° \ CA \end{aligned}$$

The operation of the calculation section 120 will be described with reference to the flowcharts shown in FIGS. 3 through 8. The operation is performed by a program having a large program loop and a small program loop. In the small loop, injection period and timing relative to arrival of a reference position signal pulse RS are determined in terms of the number of crank angle signal pulses WC and a fraction of the pulse interval Wr.

Figure 3:
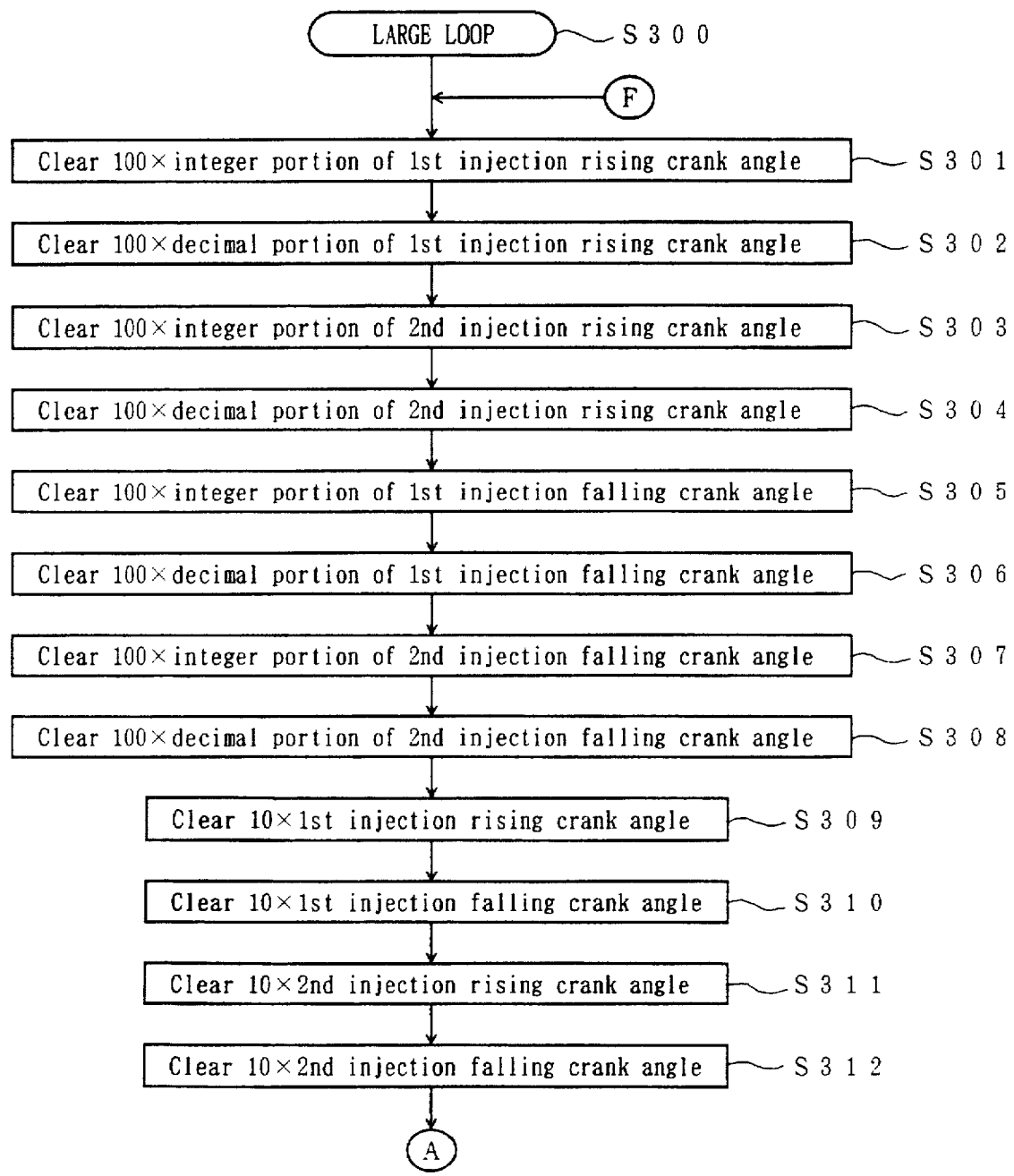
FIG. 3 is a flowchart illustrating the operation according to Embodiment 1.

The large loop is started in step S300 shown in FIG. 3. In Steps S301 through S312, crank angle values stored in the RAM are initialized or cleared so that the RAM becomes ready for operation. More specifically, the RAM has stored values equaling 100 times the integer and decimal portions of the crank angles of the rising and falling timings of the previous first injection signal pulse NL, values equaling 100 times the integer and decimal portions of the crank angles of the rising and falling timings of the previous second injection signal pulse NL, and values equaling 10 times the crank angles of the rising and falling timings of the first and second injection signal pulses NL. These values are all erased.

The above value multiplication is explained as follows. Although crank angles are detected down to two decimal places, calculation results are outputted in the form of values having only one decimal place. The individual values are calculated in the form of integer values by the computer.

Figure 4:
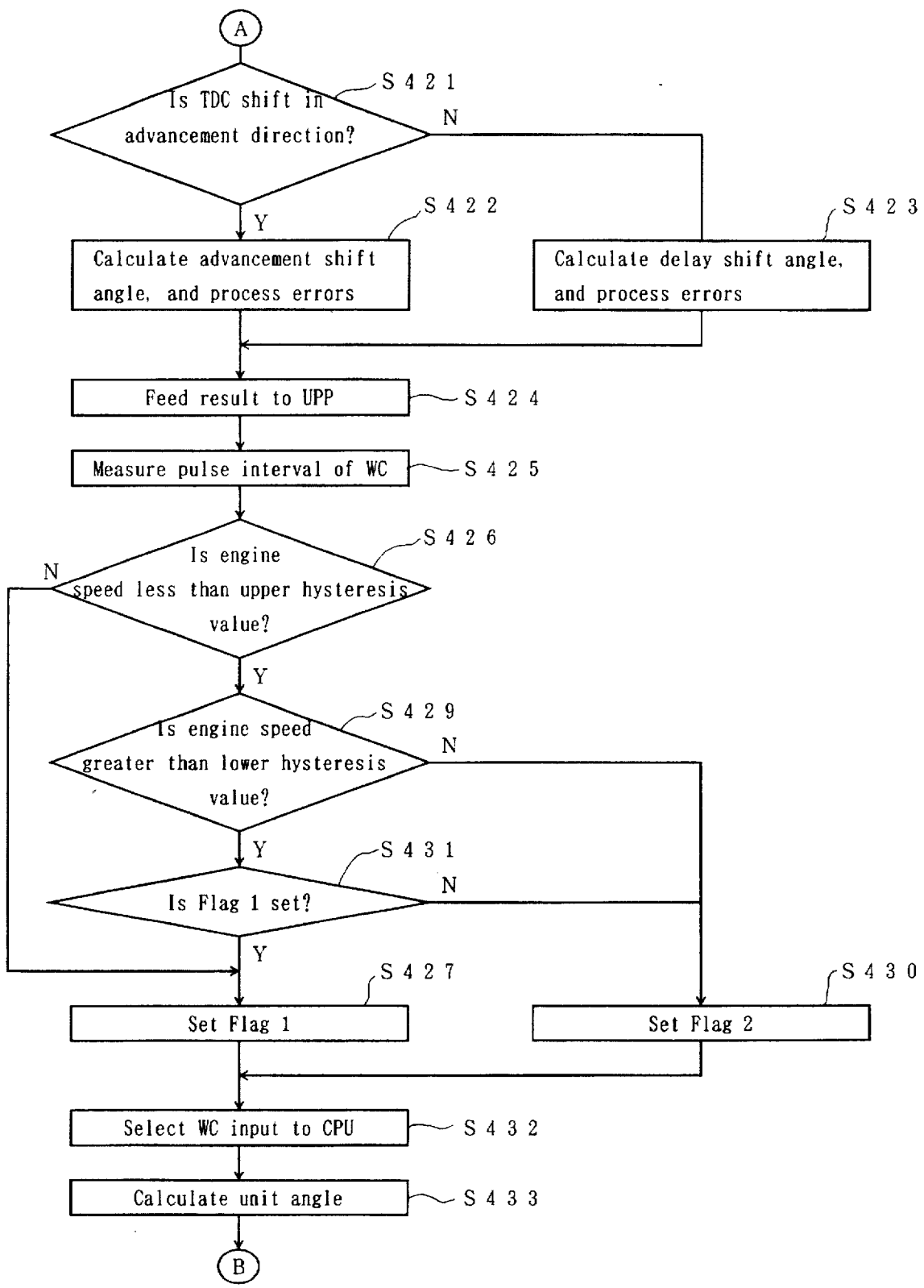
FIG. 4 is a flowchart illustrating the operation according to Embodiment 1, continuing from FIG. 3.

Steps S421 to S433 shown in FIG. 4 will be explained.

In Step S421, it is determined whether the TDC shift is in the timing advancement direction. "TDC shift" refers to the amount of shift of TDC signal pulses from reference position signal pulses RS. As described above, the TDC signal pulses have been shifted from the reference position signal pulses by changing the setting of the TDC setting unit 15b so as to synchronize with the actual TDC. As a result, the setting of the TDC setting unit equals the TDC shift.

If the TDC shift is in the timing advancement direction, operation proceeds to Step S422, where the device calculates an advancement shift angle according to the TDC shift and reduces errors in connection with the shift angle. If the TDC shift is in the timing delay direction, operation proceeds to Step S423, where the device calculates a delay shift angle according to the TDC shift and reduces errors in connection with the shift angle. In either case, the calculation result is fed to the UPP 9 in Step S424.

Step S425 measures the pulse interval Wr of the crank angle signal WC.

In Step S426 through S431, it is determined whether to perform half-frequency division of the crank angle signal WC by comparing the engine speed with upper and lower values predetermined in consideration of hysteresis. If the engine speed measured on the basis of the pulse interval of the crank angle signal WC is great, the pulse frequency of the crank angle signal WC is reduced to half so that the CPU 10 can perform measurement operation despite significant increases in the actual frequency of the signal WC.

In Step s426, it is determined whether the engine speed is less than the upper value predetermined considering hysteresis. If it is not slower, operation proceeds to Step S427, where Flag 1 is set to instruct half-frequency division. If the engine speed is less than the upper value, it is determined in Step S429 whether the engine speed is greater than the lower value predetermined considering hysteresis. If it is not greater than the lower value, Flag 2 is set in Step S430 to instruct that half-frequency division will not be performed. If the engine speed is greater than the lower value, it is determined in Step S431 whether the flag currently set is Flag 1. If it is Flag 1, operation proceeds to Step S427. If it is not Flag 1 but Flag 2, operation proceeds to Step S430.

In Step S432, an input port to the CPU 10 is selected according to the flag currently set. If Flag 1 is set, the crank angle signal pulses WC are processed by the half-frequency divider 8, and the half-frequency processed value is inputted to the CPU 10. If Flag 2 is set, the crank angle signal pulses WC are merely wave-shaped by the buffer amplifier 7, and the original value is inputted to the CPU 10 without being processed by the half-frequency divider 8.

Step S433 performs different calculations depending on whether a half-frequency processed value or an original value has been inputted, in order to determine a unit angle used for the following processing.

Figure 5:
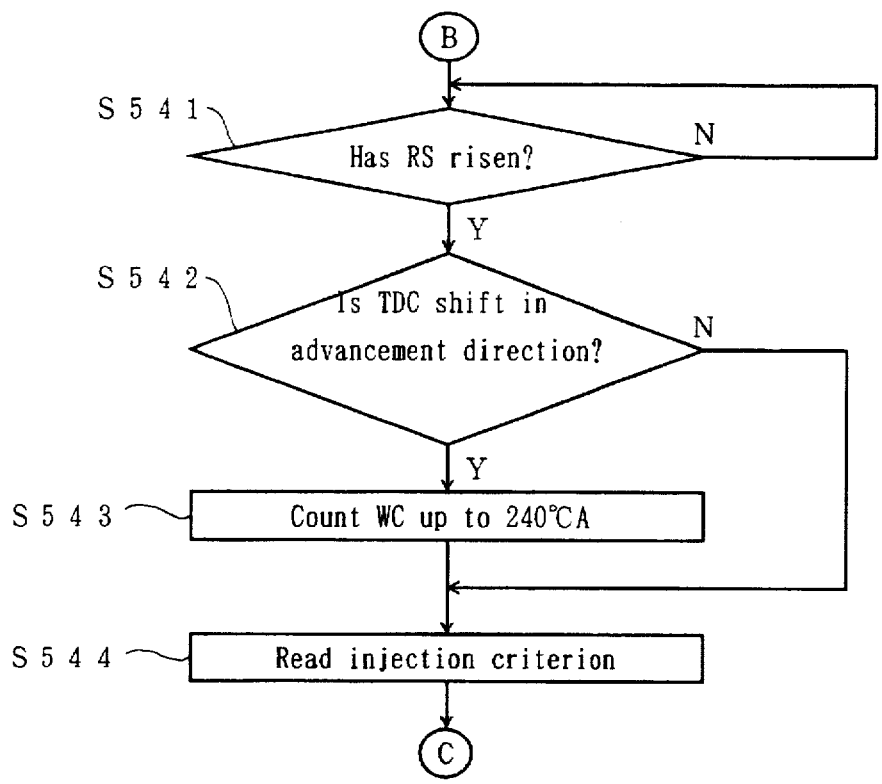
FIG. 5 is a further continuing flowchart illustrating the operation according to Embodiment 1.

In Step S541 in FIG. 5, it is determined whether the level of the reference position signal RS has risen. If it has risen, operation proceeds to Step S542. If it has not risen, Step S541 is repeated.

In Step S542, it is determined whether the TDC shift from the reference position signal RS is in the timing advancement direction, that is, whether the reference position signal pulse RS closer to the TDC occurs before the TDC. If the TDC shift is in the timing advancement direction, crank angle signal pulses WC are counted, in Step S543, up to 240° CA from the reference position signal pulse WC before operation proceeds to Step S544. In Step S544, an injection criterion is read. If the TDC shift is not in the timing advancement direction, operation goes immediately to Step S544, skipping Step S543.

As stated above, if the TDC shift is in the advancement direction, the injection measurement operation is held in Step 543 until crank angle signal pulses WC are counted up to 240° CA. This operation is based on the fact that no fuel injection is performed within 240° CA following the actual TDC in a four-stroke engine. Step 543 thus reduces operation load.

Figure 6:
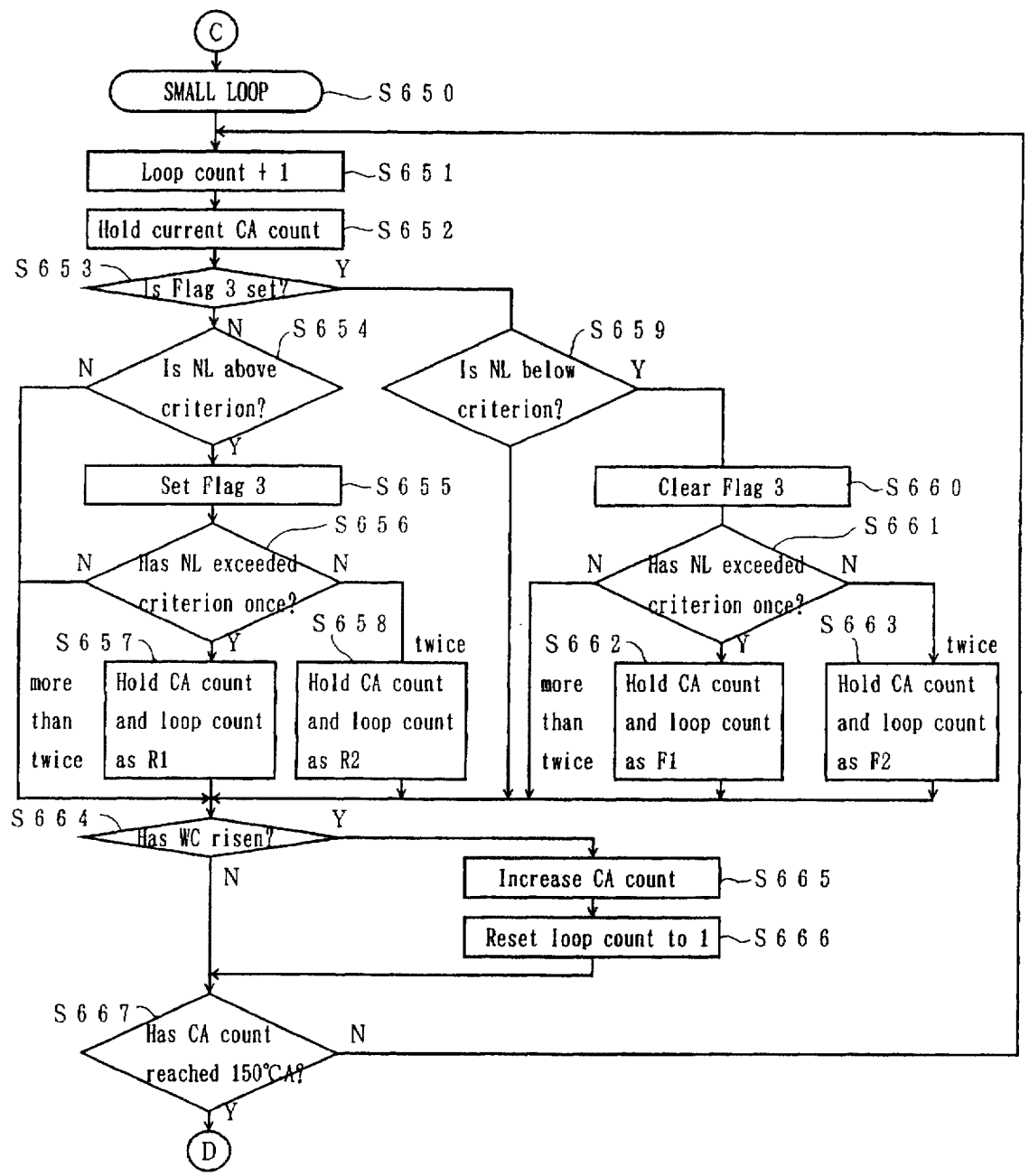
FIG. 6 is a further continuing flowchart illustrating the operation according to Embodiment 1.

With reference to FIG. 6, SMALL LOOP composed of Steps S650 through S667 will be explained.

In Step S651, the counting of loops performed is increased by 1. In Step S652, the CPU 10 holds the current crank angle count, that is, the number of crank angle signal pulses WC counted after the rising of the reference position 35 signal RS. In Step S653, it is determined whether Flag 3 has been set. If it has, operation proceeds to Step S659. If it has not been set, operation proceeds to Step S654.

In Step 654, it is determined whether the level of the injection signal NL is higher than the injection criterion. If it is higher, Flag 3 is set in Step S655 followed by Step S656. If it is not higher, operation goes to Step S664.

Step S656 determines whether the level of injection signal NL has exceeded the injection criterion once, twice, or more than twice. If it has exceeded once, operation proceeds to Step S657 to hold the crank angle count obtained in Step S652 and the latest loop count as a first value R1. Then operation proceeds to Step S664. If the level of the injection signal NL exceeded the criterion twice, operation proceeds to Step S658 to hold the crank angle count and the latest loop count as a second value R2. Operation then proceeds to Step S664. If the signal level has exceeded the criterion more than twice, operation immediately goes to Step S664.

If it is determined in Step S653 that Flag 3 has been set, operation proceeds as follows.

In Step S659, it is determined whether the level of the injection signal NL is lower than the injection criterion. If NL is lower, Flag 3 is cleared in Step S660. If NL is not lower than the injection criterion, operation goes to S664.

In Step S661, it is determined whether the level of the injection signal NL has exceeded the injection criterion once, twice, or more than twice. If it has exceeded once, operation proceeds to Step S662 to hold the crank angle count and the latest loop count as a first value F1. Then operation proceeds to Step S664. If the level of the injection signal NL has exceeded the criterion twice, operation proceeds to Step S663 to hold the crank angle count and the latest loop count as a second value F2. Operation then proceeds to Step S664. If the signal level has exceeded the criterion more than twice, operation immediately goes to Step S664.

In Step S664, it is determined whether the level of the crank angle signal WC has risen. If it has, the crank angle count is accordingly increased by, for example, 1, in Step S665. Then, the loop count is reset to value 1 in Step S666, followed by Step S667.

If it is determined that the level of the crank angle signal WC has not risen, operation goes immediately to Step S667.

Figure 7:
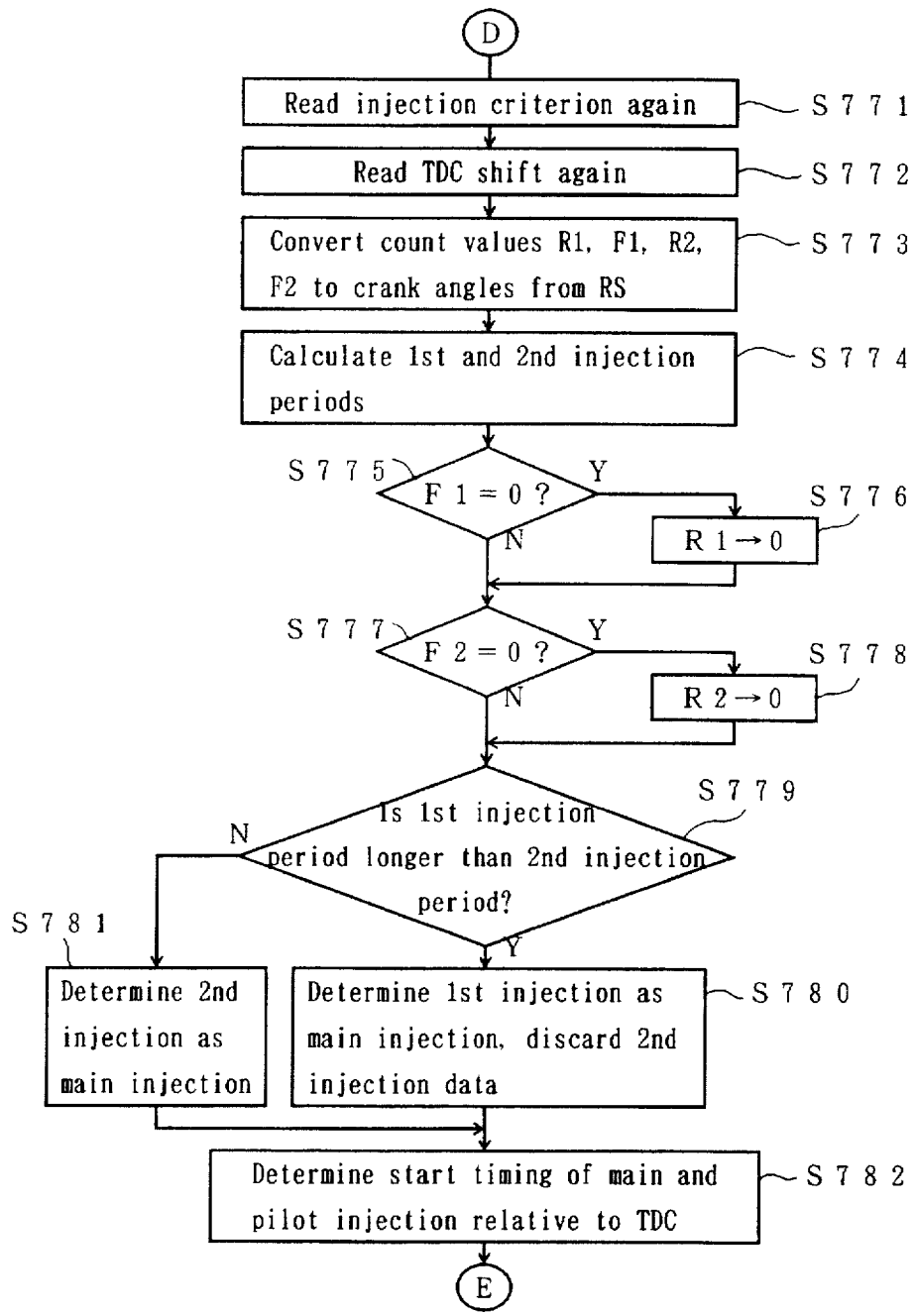
FIG. 7 is a further continuing flowchart illustrating the operation according to Embodiment 1.

In Step S667, it is determined whether the crank angle count has reached (or exceeded) 150° CA relative to the reference position signal pulse RS. There should be no fuel injection beyond 150° CA. Therefore, if the crank angle count indicates 150° CA or greater, inputting of the injection signal NL is stopped, and operation goes out of the small loop to Step S771 (FIG. 7). If the crank angle count indicates less than 150° CA, operation returns to Step S651.

Referring to FIG. 7, an injection criterion for the next operation is read in Step S771. As understood, the injection criterion can be changed for every operation.

In Step S772, a TDC shift is read for the next operation. The TDC shift can be changed for every operation.

Step S773 converts the count value (R1) indicating the rising of the first injection, the count value (F1) indicating the falling of the first injection, the count value (R2) indicating the rising of the second injection, and the count value (F2) indicating the falling of the second injection, each of which corresponds to the combination of the number (integer) of crank angle signal pulses WC counted from the reference position signal pulse RS and the fraction (time value) obtained from the loop count, into crank angles R1, F1, R2, F2 relative to the reference position signal pulse RS.

According to this embodiment, the above angles are actually determined or measured relative to the rising of the first crank angle signal pulse WC immediately following the rising of the reference position signal pulse RS. Normally, the rising of the first crank angle signal pulse WC does not coincide with the rising of the reference position signal pulse RS. However, the phrase "the crank angle relative to the reference position signal pulse RS" is used in this specification for convenience.

Step S774 calculates the first injection period and the second injection period by using formula (2) based on the crank angle values R1, F1, R2, F2.

In Steps S775–S778, if a signal-rising crank angle is not accompanied by the corresponding signal-falling crank angle, the signal-rising crank angle is determined as noise and is erased.

In Step S775, it is determined whether the first injection signal-falling crank angle F1 is 0 (zero). If it is 0, the first injection signal-rising crank angle R1 is reset to 0 in Step S776 followed by Step S777. If it is not 0, operation proceeds immediately to Step S777.

In Step S777, it is determined whether the second injection signal-falling crank angle F2 is 0. If it is, the second injection signal-rising crank angle R2 is reset to 0 in Step S778 followed by Step S779. If it is not 0, operation proceeds immediately to Step S779.

The operation in Steps S779–S782 discriminates a pilot injection, a main injection and a secondary injection based on the length of the lift duration of the injection signal NL monitoring the lift of the injection valve.

Step S779 compares the first injection period with the second injection period determined in Step S774. If the first injection period is longer than the second injection period, operation proceeds to Step S780, where the first injection is determined as a main injection and, the second injection is determined as a secondary injection and the data thereof is discarded. Operation then proceeds to Step S782. If the first injection period is not longer than the second injection period, operation proceeds to Step S781, where the first injection is determined as a pilot injection and the second injection is determined as a main injection. Operation then proceeds to Step S782.

In Step S782, the CPU 10 converts the start timings of the pilot injection and the main injection to crank angles relative to the actual TDC based on the TDC shift obtained in Step S772, crank angles R1, F1, R2, F2 obtained in Step S773. Each of the pilot and main injection start crank angles relative to the actual TDC is provided as a difference between the crank angle of the actual TDC relative to the rising of the crank angle signal pulse immediately following the rising of the reference position signal pulse RS and the injection start crank angle relative to that rising of the crank angle signal pulse WC.

Figure 8:
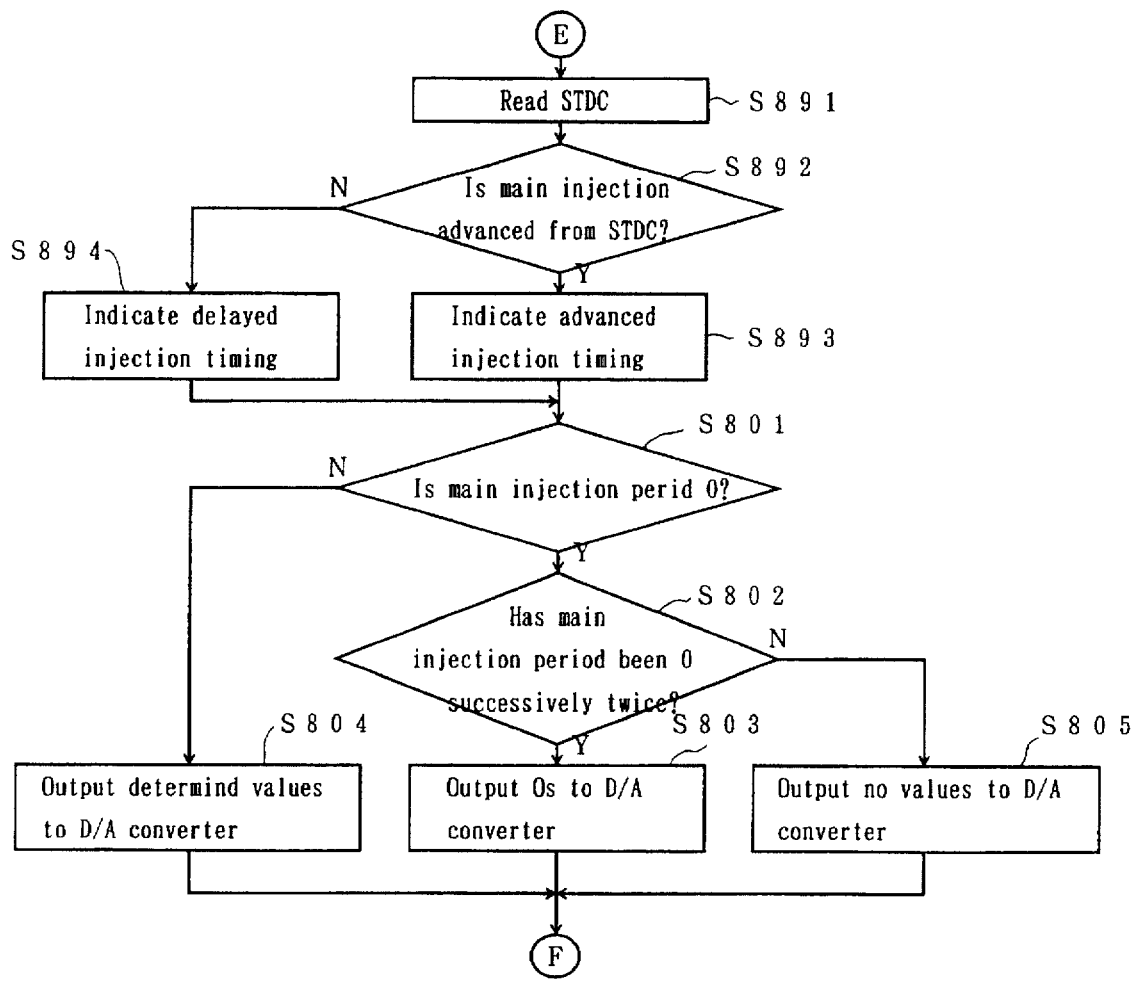
FIG. 8 is a further continuing flowchart illustrating the operation according to Embodiment 1.

Referring to FIG. 8, Step S891 reads a further TDC shift (STDC). Step S892 determines whether the main injection start timing is advanced or delayed relative to the STDC. The determination in Step S892 is then indicated by a STDC lamp. Advanced timing is indicated in Step S893 by, for example, a green light. Delayed timing is indicated in Step S894 by, for example, a red light.

The above operation thus determines whether the main injection start timing is before or after the STDC set with reference to the actual TDC, in addition to determining whether that timing is before or after the actual TDC.

Step S801 determines whether the main injection period thus determined is 0 (zero).

If it is not 0, the determined values of the main injection timing and period are outputted to the D/A converter 13 in Step S804. Operation then returns to Step S301 (FIG. 3).

If it is 0, operation proceeds to Step S802, where it is determined whether the main injection period value has been 0 in the last two measurements.

If it has been 0 in the last two measurements, "0" values are outputted to the D/A converter 13 in Step S803. Operation then returns to Step S301.

If it has not been 0 in the last two measurements, no values are outputted to the D/A converter 13 in Step S805. Operation then returns to Step S301. Because each cylinder of a four-stroke engine experiences one injection every two crank-shaft rotations, "0" values are normally obtained in every other injection determination operation. Therefore, such normally determined "0" values are ignored.

Embodiment 2

Figure 9:
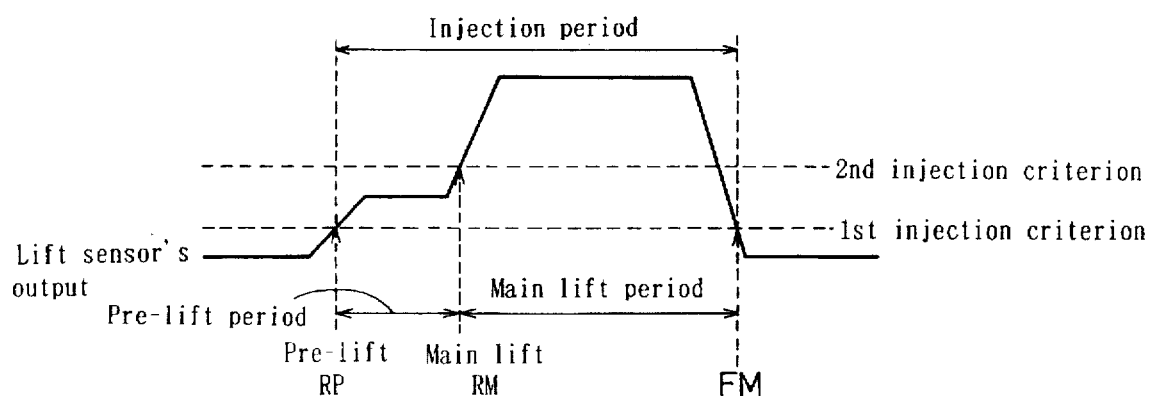
FIG. 9 illustrates a concept of operation according to Embodiment 2.

Embodiment 2 will be described with reference to FIGS. 9 to 12. Embodiment 2 provides a basic concept of operation for a so-called double spring injection valve that is lifted by two steps, that is, a pre-lift and a main lift as shown in FIG. 9. The operation monitors the timings and periods of the respective lifts.

Figure 10:
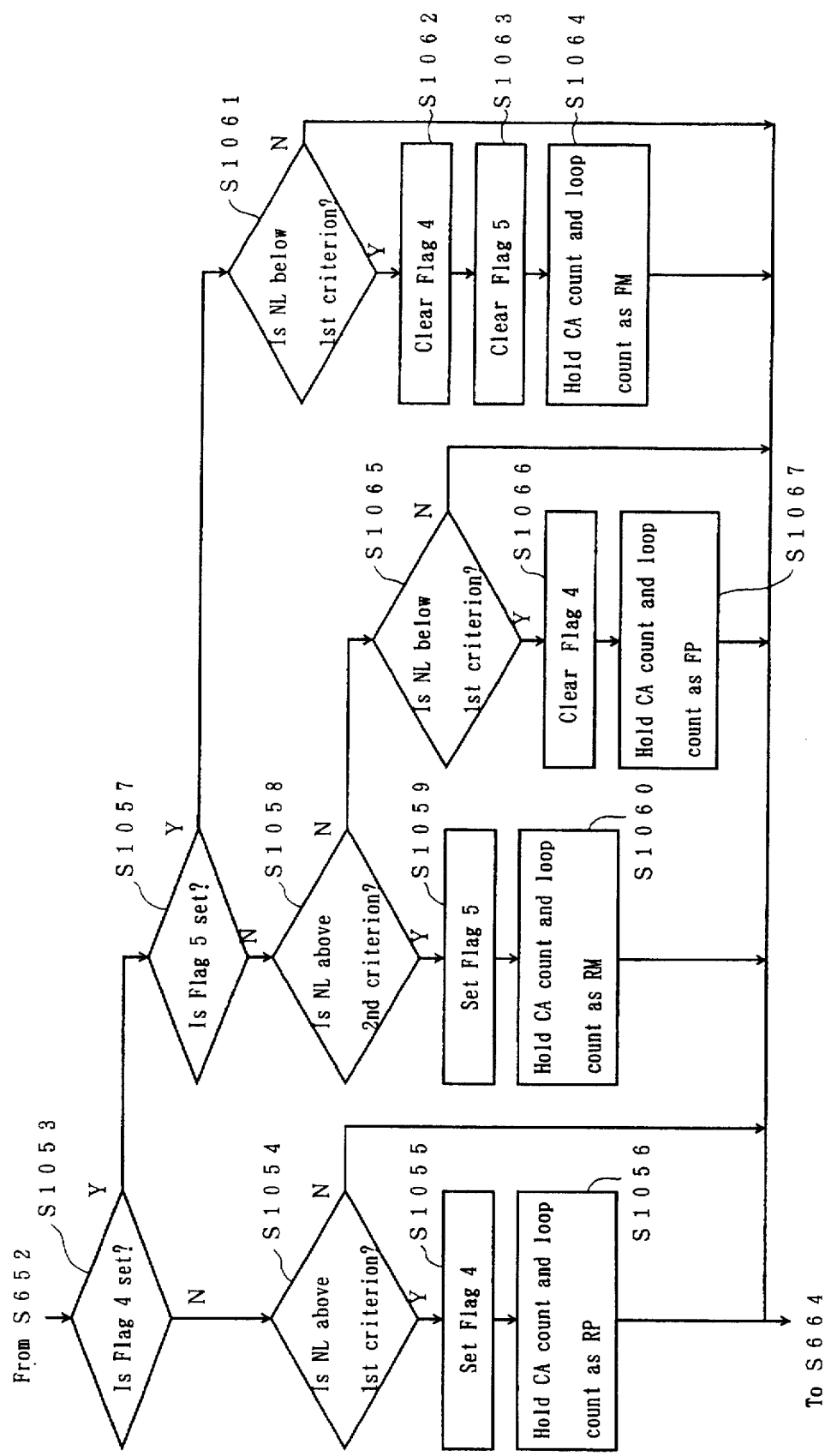
FIG. 10 is a flowchart illustrating the operation according to Embodiment 2.
Figure 11:
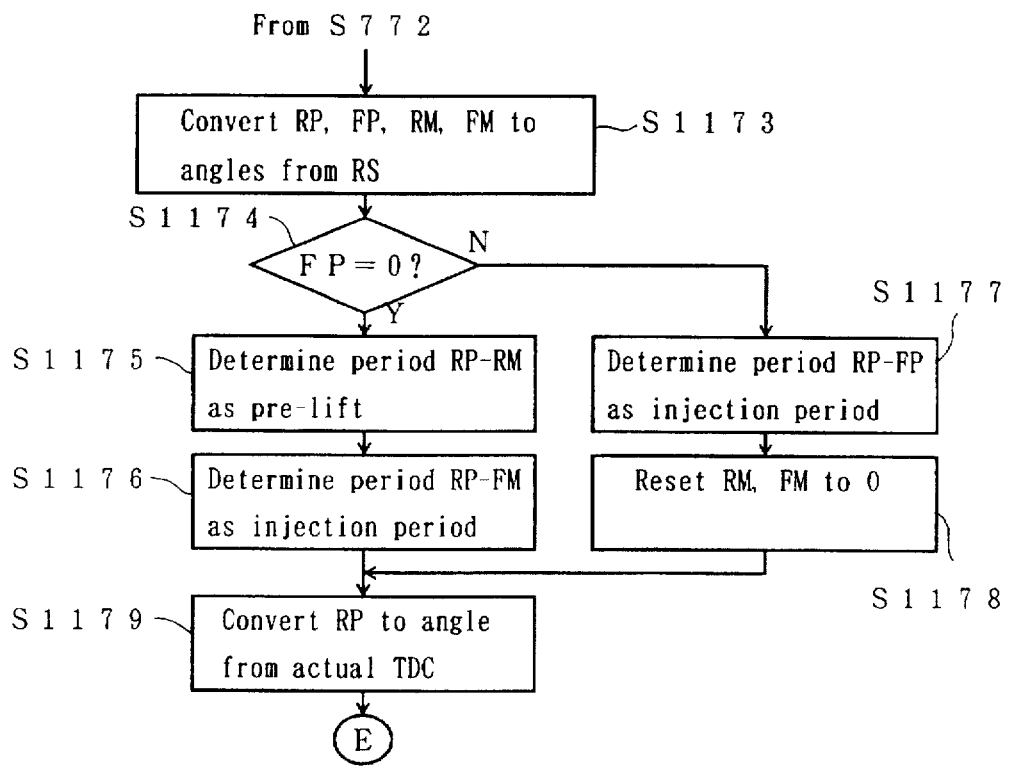
FIG. 11 is a flowchart illustrating the operation according to Embodiment 2.
Figure 12:
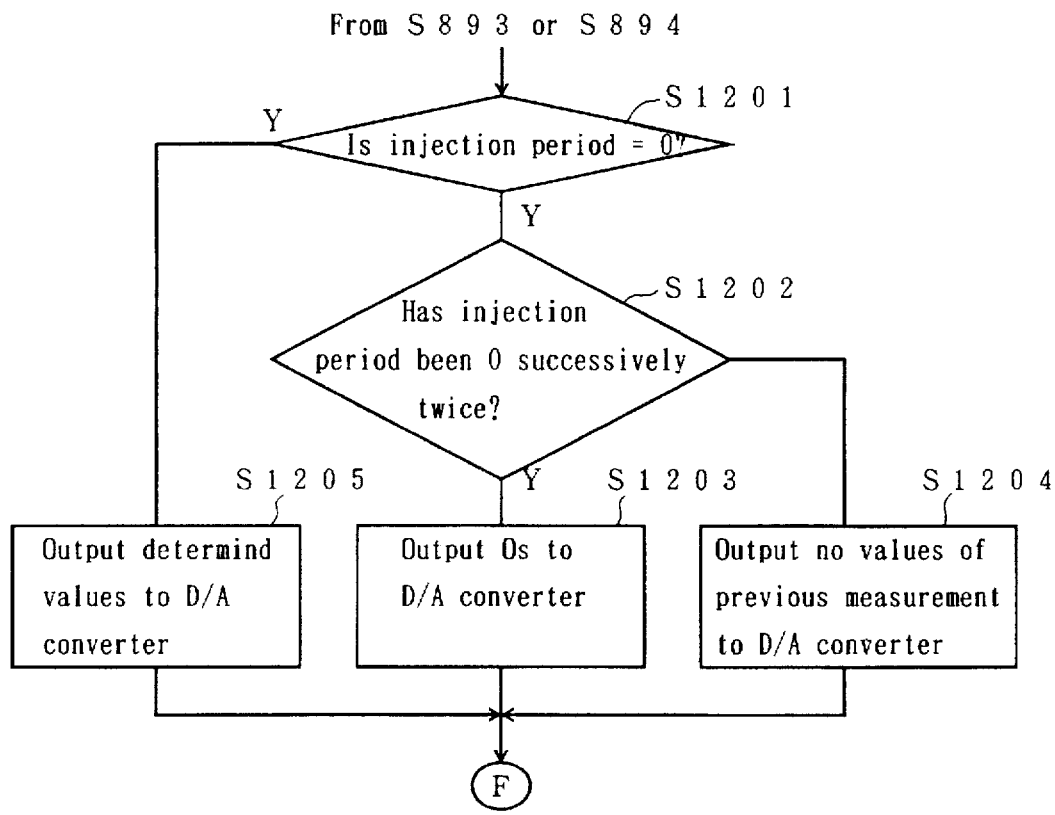
FIG. 12 is a flowchart illustrating the operation according to Embodiment 2.

The flowcharts of FIGS. 10 to 12 show steps that are different from those of the Embodiment 1.

Referring to FIG. 10, Steps S1053–S1067 substitute Steps S653–S663 in the small loop of Embodiment 1.

Step S1053 determines whether Flag 4 has been set. Flag 4 indicates that the level of the injection signal NL has exceeded the first injection criterion. If Flag 4 has not been set, operation proceeds to Step S1054. If Flag 4 has been set, operation proceeds to Step S1057.

Step S1054 determines whether the level of the injection signal NL is higher than the first injection criterion. If it is not higher, operation goes to Step S664. If it is higher, Flag 4 is set in Step S1055 followed by Step S1056. Step S1056 holds the crank angle count and the latest loop count as a value RP. Operation then goes to Step S664.

On the other hand, Step S1057 determines whether Flag 5 has been set. Flag 5 indicates that the level of the injection signal NL has exceeded the second injection criterion. If Flag 5 has not been set, operation proceeds to Step S1058. If Flag 5 has been set, operation proceeds to Step S1061.

Step S1058 determines whether the level of the injection signal NL is higher than the second injection criterion. If it is not higher, operation goes to Step S1065. If it is higher, Flag 5 is set in Step S1059. Then, Step S1060 holds the crank angle count and the latest loop count as a value RM. Operation then goes to Step S664.

If Step S1058 determines that the level of the injection signal NL is not higher than the second injection criterion, it is determined in Step S1065 whether the level of injection signal NL is lower than the first injection criterion. If it is not lower, operation goes to Step S664. If it is lower, Flag 5 is cleared in Step S1066. Then, Step S1067 holds the crank angle count and the latest loop count as a value FP ("FP" is not indicated in FIG. 9, because the pattern indicated in FIG. 9 does not cover this phenomenon). Operation then goes to Step S664.

If Step S1057 determines that Flag 5 has been set, it is then determined in Step S1061 whether the level of the injection signal NL is lower than the first injection criterion. If it is not lower, operation goes to Step S664. If it is lower, Flag 4 is cleared in Step S1062 followed by Step S1063, where Flag 5 is cleared. Then, Step S1064 holds the crank angle count and the latest loop count as a value FM. Operation then goes to Step S664.

Steps S1173–S1179 of FIG. 11 are alternative Steps S773–S782 of Embodiment 1.

Step S1173 converts the above values RP, FP, RM, FM into crank angles RP, FP, RM, FM relative to the reference position. Step S1174 determines whether the crank angle FP is 0 (zero).

If the crank angle FP is 0, operation proceeds to Step S1175, where the period between RP and RM is determined as a pre-lift. In Step S1176, the period between the RP and FM is determined as an injection period. Operation then proceeds to Step S1179.

If the crank angle FP is not 0, operation proceeds to Step S1177, where the period between RP and FP is determined as an injection period. The crank angles RM and FM are reset to 0 in Step S1178 followed by Step S1179.

Step S1179 converts the crank angle RP to the crank angle relative to the actual TDC.

Steps S1201–S1205 of FIG. 12 substitute Steps S801S805 of Embodiment 1.

Step S1201 determines whether the injection period is 0 (zero).

If it is 0, operation proceeds to Step S1202, where it is determined whether the injection period has been determined as "0" consecutively in the last two measurement operations. If it has been 0 in the last two measurement operations, "0" values are outputted to the D/A converter 13 in Step S1203. Operation then returns to Step S301. If it has not been 0 consecutively in the last two measurement operations, no values are outputted to the D/A converter 13 in Step S1204. Operation then returns to Step S301.

If it is determined in Step S1201 that the injection period is not 0, operation proceeds to Step S1205, where the determined values of the injection timing and period are outputted to the D/A converter 13. Operation then returns to Step S301.

Although Embodiment 2 has been described without considering pilot injection, it should be understood that this embodiment can also be modified so as to discriminate pilot injection and main injection as in Embodiment 1.

Embodiment 3

Embodiment 3 will be described with reference to FIG. 13. This embodiment determines the zero and peak levels of the injection signal NL and corrects or varies the injection criterion according to the difference between the zero and peak levels.

Figure 13:
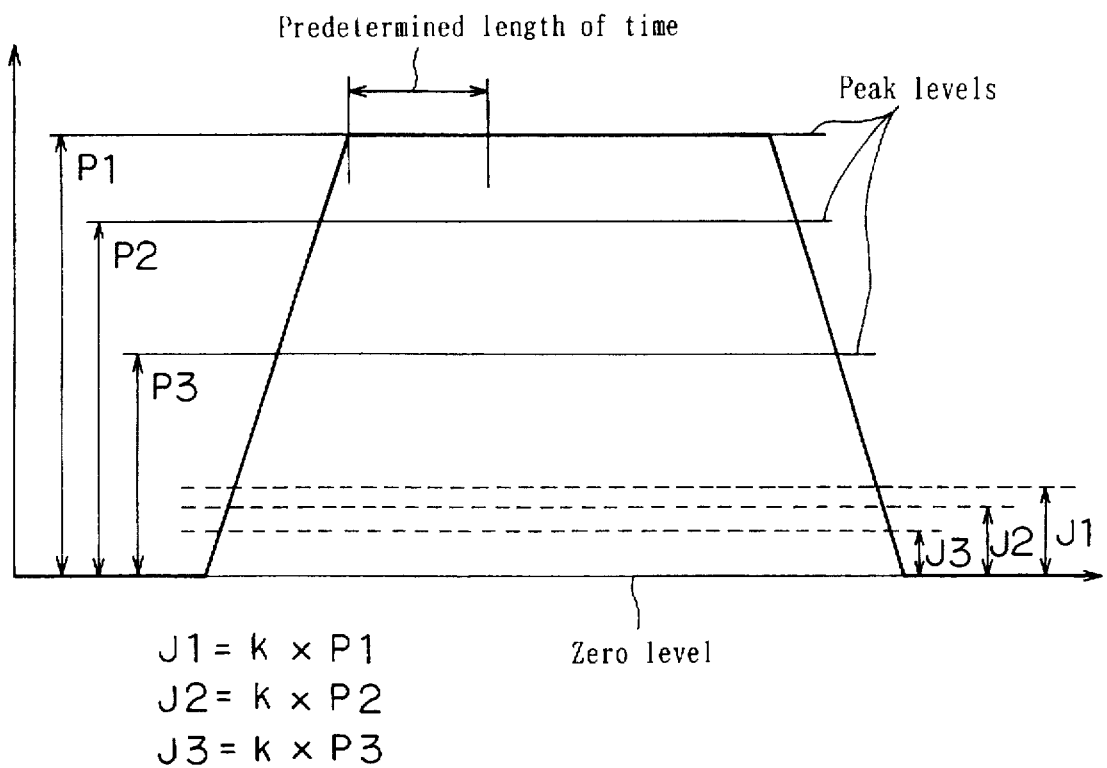
FIG. 13 illustrates a concept of operation according to Embodiment 3.

As indicated in FIG. 13, injection criteria J1, J2 and J3 are provided as follows:

$$J1=k \times P1$$

$$J2=k \times P2$$

$$J3=k \times P3$$

where:

P1, P3, P3 are various peak levels relative to the zero level; and k is a constant.

This correction of the injection criterion will offset individual variation of lift sensors and operational changes with time.

This embodiment also employs a predetermined time length (criterion) to discriminate normally-set injection and mistakenly-set injection. If an injection period measured is shorter than this predetermined time length, the measured period is determined as noise.

These injection criteria are inputted in Step S771 of FIG. 7. Embodiment 3 substantially follows the flowcharts explained above.

Embodiment 4

Embodiment 4 will be described with reference to FIG. 14, which illustrates various pulses of the injection signal NL. This embodiment employs a principle that actual injection valve lift produces a certain level of the injection signal NL that continues for a certain length of time. If the level of the injection signal NL remains higher than an injection criterion for a period not shorter than a time length predetermined according to the peak level of the signal (hereinafter, referred to as "injection duration criterion"), it is determined that injection valve lift has actually occurred. If the level of the injection signal NL exceeds the injection level criterion but falls below the criterion before such a time period (injection duration criterion) elapses, it is determined that normal injection valve has not occurred but that such a rise in signal level is noise.

This principle is based on the fact that actual valve lift to a certain opening requires a certain length of time and cannot be achieved instantaneously. Therefore, instantaneous rising of the injection signal level is determined as noise according to this embodiment.

Figure 14:
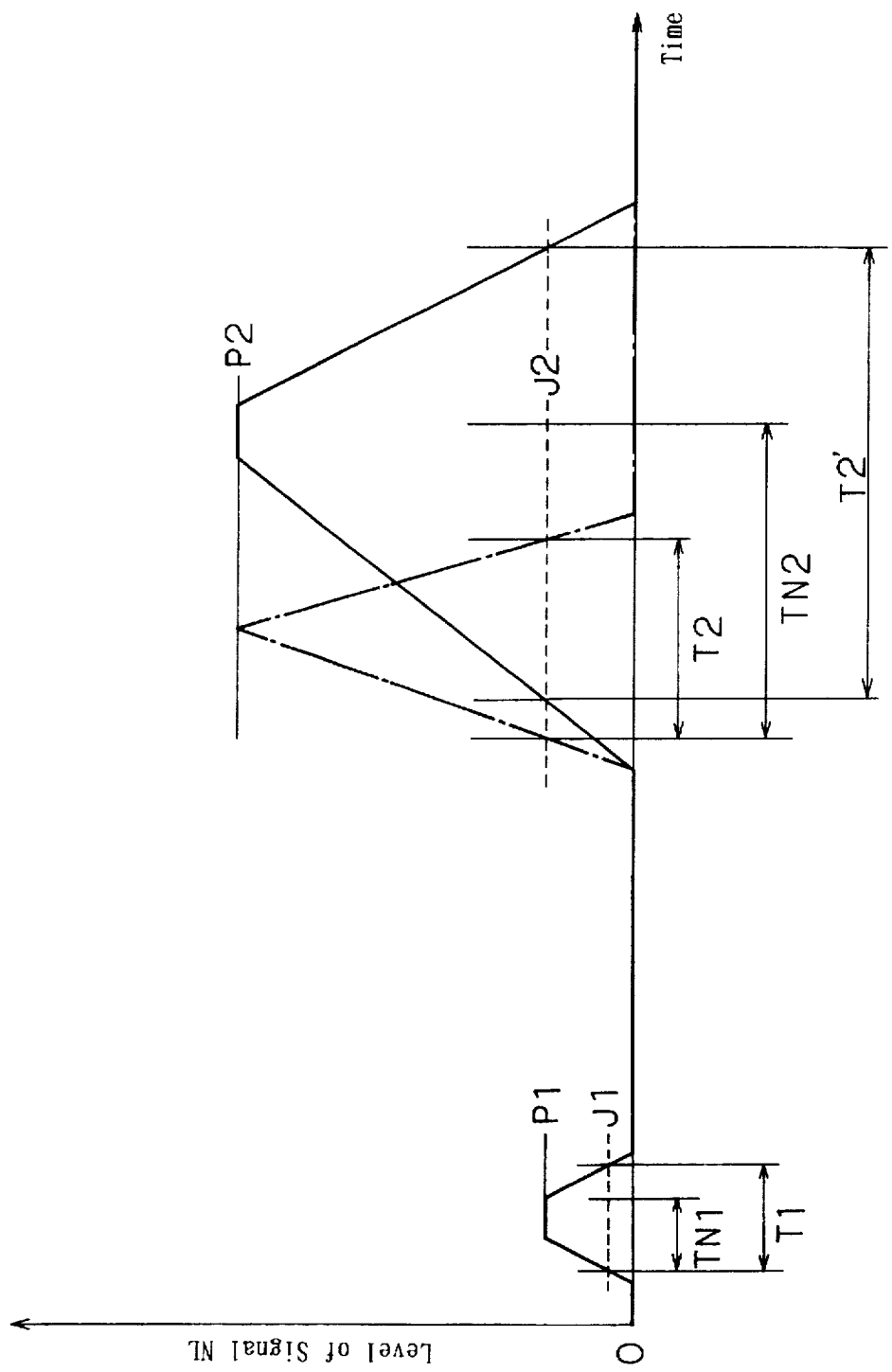
FIG. 14 illustrates a concept of operation according to Embodiment 4.

Referring to the small signal pulse in FIG. 14, the peak level P1 is relatively low but the effective high-level duration T1 is relatively long, more specifically, longer than the injection duration criterion TN1. Herein, the effective high-level duration T1 refers to the duration during which the signal level remains higher than the injection level criterion J1 determined according to the peak level P1. The injection duration criterion TN1 is predetermined according to the peak level P1 as mentioned above. Since Ti>TN1, it is determined that this signal pulse represents an actual injection valve lift.

With regard to the large signal pulse indicated by a broken line, the peak level P2 is relatively high but the effective high-level duration T2 is relatively short, more specifically, shorter than the injection duration criterion TN2. Herein, the effective high-level duration T2 refers to the duration during which the signal level remains higher than the injection level criterion J2 predetermined according to the peak level P2.

The injection duration criterion TN2 is predetermined according to the peak level P2. Since T2<TN2, it is determined that this signal pulse does not represent an actual injection valve lift but is noise.

With regard to the large signal pulse with the peak level P2 indicated by a solid line, the effective high-level duration T2' is longer than the TN2. Therefore, it is determined that the pulse represents an actual injection valve lift.

Embodiment 4 can detect an injection valve lift producing a low peak in the injection signal NL. Furthermore, if the injection signal NL exceeds a predetermined level but falls below the predetermined level within a predetermined period of time, such a signal pulse is determined as noise.

Similar to Embodiment 3, Embodiment 4 follows the flowcharts explained above.

Embodiment 5

The above embodiments employ the small loop as shown in FIG. 6 to count crank angle signal pulses WC and measure a fraction of the interval of the crank angle signal pulses WC in order to determine the injection start timing and the injection period relative to arrival of a reference position signal pulse RS. Embodiment 5, however, employs hardware counters to perform such operation, thereby reducing the calculation load and eliminating the necessity of a universal pulse processor (UPP).

Figure 15:
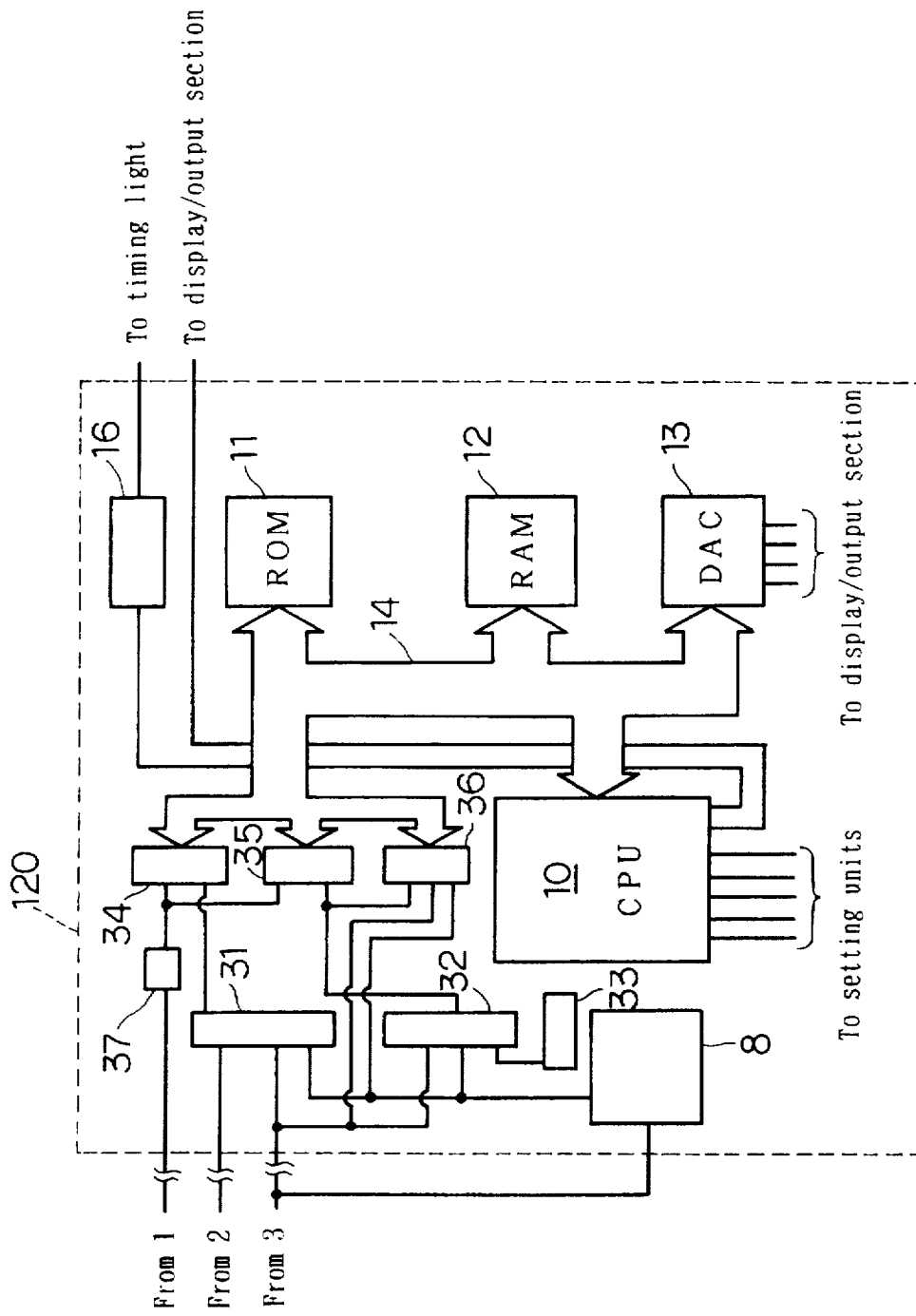
FIG. 15 illustrates the construction of Embodiment 5.

Referring to FIG. 15, which shows an enlarged view of main portions of a calculation section 120 according to Embodiment 5, a first counter 31 receives reference position signal pulses RS and crank angle signal pulses WC sent from a reference position sensor 2 and a crank angle sensor 3, respectively, via at least one other circuit of a detection section 110 as shown in FIG. 1. A second counter 32 receives crank angle signal pulses WC from the crank angle sensor 3 via at least one other circuit of the detection section 110 or via a frequency divider 8, and signal pulses of a predetermined frequency, for example, 312.5 KHz, which is outputted from an oscillator 33.

First, second and third latch processors 34, 35, 36 comprise bistable circuits. The first latch processor 34 receives injection signal pulses NL from a lift sensor 1 via a rise/fall detector 37, and count signal pulses from the first counter 31. The second latch processor 35 receives injection signal pulses NL from the lift sensor 1 via a rise/fall detector 37, and count signal pulses from the second counter 32. The third latch processor 36 receives crank angle signal pulses from the crank angle sensor 3 directly or via the frequency divider 8, and count signal pulses from the second counter 32.

The latch processors 34, 35, 36 are connected to a CPU 10, a ROM 11, a RAM 12 and a DAC 13 via a bus 14.

Figure 16:
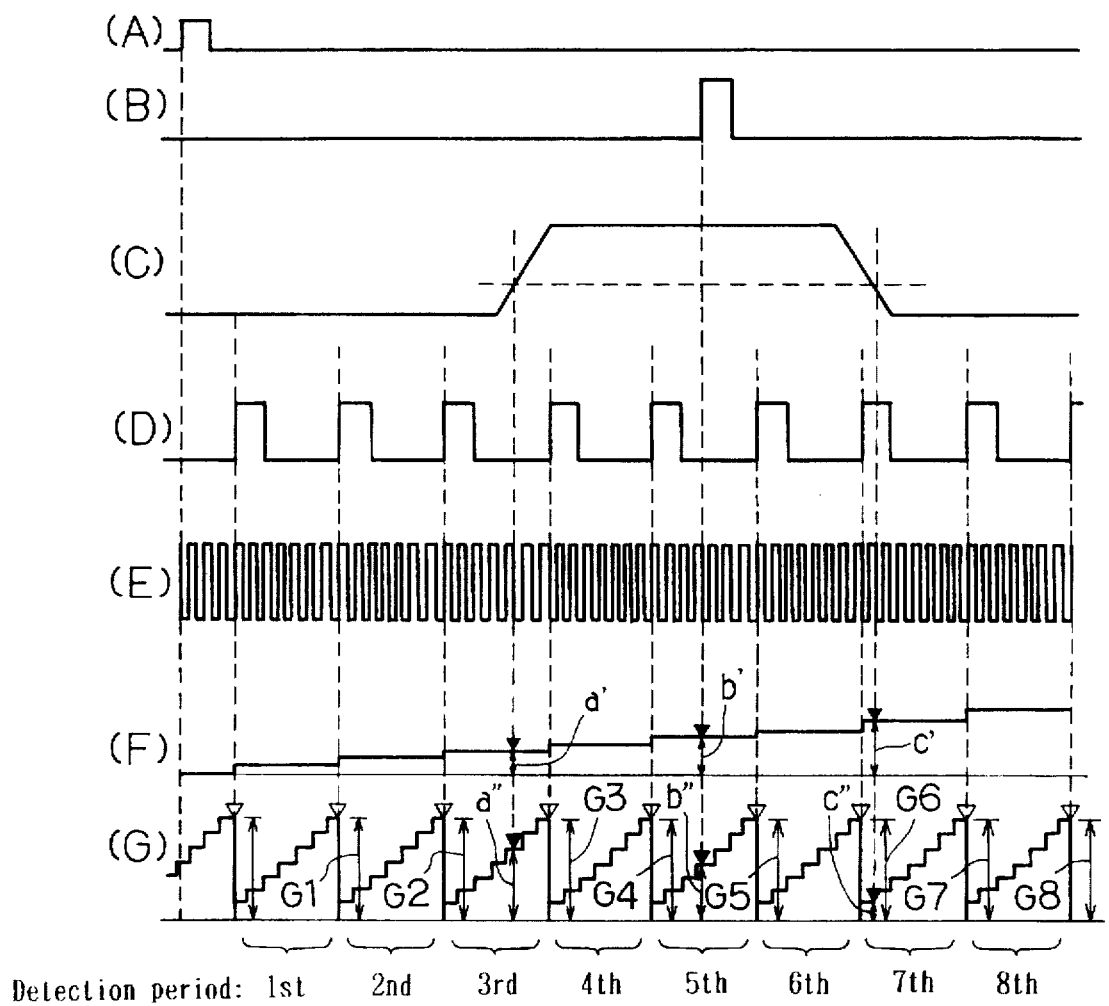
FIG. 16 illustrates a concept of operation according to Embodiment 5.

The operation of this embodiment will be described with reference to FIG. 16, in which (A) indicates reference position signal RS; (B) indicates TDC signal; (C) indicates injection signal NL; (D) indicates crank angle signal WC (D); (E) indicates signal pulses from the oscillator 33; (F) indicates the operation of the first counter 31; and (G) indicates the operation of the second counter 32.

As indicated by (F), counting of the first counter 31 is cleared every time when a reference position signal pulse RS rises. Subsequently, every time when the first counter 31 receives a crank angle signal pulse WC, the first counter 31 counts up and outputs the count value to the first latch processor 34. Based on signals from the CPU 10, the first latch processor 34 latches count values a', b', c' to the RAM 12 at timings (indicated by symbols ▼) at which the level of an injection signal pulse NL exceeds a criterion, at which a TDC signal pulse rises, and at which the level of the injection signal pulse NL falls below the criterion. The count values a', b', c' thus stored in the RAM 12 correspond to the values a, b, c in the foregoing formulas (3), (4) and (5).

As indicated by (G), counting of the second counter 32 is cleared every time when a crank angle signal pulse WC rises. The second counter 32 counts signal pulses from the oscillator 33 and outputs count values to the second and third latch processors 35, 36.

The second latch processor 35, based on signals from the CPU 10, latches count values a", b", c" to the RAM 12 at timings (indicated by symbols ▼) at which the level of an injection signal pulse NL exceeds the criterion, at which a TDC signal pulse rises, and at which the level of the injection signal pulse NL falls below the criterion. The count values a", b", c" thus stored in the RAM 12 each indicate the number of signal pulses outputted by the oscillator 33 during a period between the respective latch timing and the rising of the immediately preceding crank angle signal pulse WC.

The third latch processor 36, based on the crank angle signal WC, latches count values Gn to the RAM 12 at the rising of crank angle signal pulses WC (indicated by symbols ▽). The count values Gn each indicate the number of signal pulses outputted by the oscillator 33 during a pulse interval Wr of the crank angle signal WC.

Thus, a fraction of the pulse interval Wr of the crank angle signal WC, which is required for precise determination of the above timings and the like relative to a reference position signal pulse RS, can be determined as the proportion of a count value latched by the second latch unit 35 to a count value latched by the third latch unit 36.

For example, the period between the timing at which the level of the injection signal NL exceeds the criterion and the rising of the immediately preceding crank angle signal pulse WC is determined as:

$$Wr \times a''/G2$$

where:

Wr is a pulse interval of the crank angle signal WC, a" is the count value of the second counter 32, and G2 is the number of signal pulses outputted from the oscillator 33 during the second detection period after the rising of the reference position signal pulse RS. Although the value a" is obtained during the third detection period, the value G2 is used instead of the value G3. This is explained as follows. G2 is obtained prior to detection of the value a" so that the above calculation can be performed immediately when a" is obtained. On the other hand, because G3 can be obtained only after detection of a", the calculation must wait for a certain amount of time after a" is obtained. In addition, G2 and G3 normally do not significantly differ from each other.

Accordingly, the period T1 between the rising of the reference position signal pulse RS and at the timing at which the level of the injection signal NL exceeds the criterion can be obtained as follows:

$$T1 = W0 + (a' \times Wr) + (Wr \times a''/G2)$$

where:

a' is the count value of the first counter 31, and

W0 is a period between the rising of the reference position signal pulse RS and the rising of the immediately following crank angle signal pulse WC, W0 being canceled in the later calculation.

The period T2 between the rising of the reference position signal pulse RS and the rising of the TDC signal pulse, and the period T3 between the rising of the reference position signal pulse RS and the timing at which the level of the injection signal NL exceeds the criterion can be obtained in similar manners.

Operations other than the above calculations remain generally the same as in the other embodiments.

If the frequency of the oscillator 33 is 312.5 KHz and the engine speed is 5000 rpm, the determination precision will be as follows. The engine speed can be expressed as:

$$5000 \text{ rpm} = 83.3 \text{ revolutions per second} = 83.3 \times 36020 \text{ per second} = 29988° \text{ per second}$$

Then, the time required for revolution of 1° is:

$$1/29988° = 3.33 \times 10^{-5} \text{ (sec.)}$$

The interval of pulses of 312.5 KHz is:

$$1/(312.5 \times 1000) = 3.20 \times 10^{-6} \text{ (sec.)}$$

The angle increment corresponding to one pulse interval is:

$$(3.20 \times 10^{-6})/(3.33 \times 10^{-5}) = 0.096 \text{ (°)}$$

Thus, precision of approximately 0.1° is achieved.

Although the preferred embodiments have been described in connection with a test apparatus, the injection timing measuring device and method of the present invention can be incorporated in a vehicle for feedback control of the engine. For example, the invention can be applied to a feedback control system which detects an injection timing and, based on the detection, maintains the injection timing within a predetermined range. When the invention is employed in a vehicle, the TDC signal can be provided by presetting in an assembly plant, a TDC shift angle which have been determined relative to the reference position signal by using a timing light, or by a TDC sensor incorporated in the control system. Such a vehicle-mounted control system requires means for achieving proper injection timing control despite variations in the TDC shift with time. However, no substantial changes are required in the operational steps as described above.

The injection timing measuring device and method of the invention can be applied to various types of engines, such as diesel engines, or gasoline engines.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An engine injection timing measuring method for determining injection timing while the engine is running, comprising the steps of:

measuring, while the engine is running, a first period starting when a reference position signal is generated at a predetermined timing prior to starting of fuel injection from an injection valve provided in the running engine, and ending when an injection signal is generated in response to actual time of fuel injection from the injection valve, the reference position signal corresponding to a reference position on a crank shaft;

measuring, while the engine is running, a second period from the generation of the reference position signal to a top dead center position based on the crank angle signal; and determining an injection timing relative to the top dead center position, while the engine is running, based on first period and said second period.

2. An injection timing measuring device comprising:

crank angle signal generating means for generating a crank angle signal during each increment of a predetermined crank angle that indicates a rotational angle of a crank shaft provided in an engine;

reference position signal generating means for generating a reference position signal at a predetermined timing prior to fuel injection from an injection valve provided in the engine, the reference position signal corresponding to a reference position on the crank shaft;

injection signal generating means for sensing a contemporaneously measured actual time when the injection valve injects fuel in the engine when it is running, and for generating a corresponding injection signal;

top dead center signal generating means for generating a top dead center signal when a piston reaches a top dead center position in the engine; and fuel injection timing calculating means for calculating a fuel injection timing of the engine when it is running relative to the top dead center position based on a first period that is determined while the engine is running and starting at a time corresponding to when the reference position signal is generated by the reference position signal generating means and ending upon generation of the injection signal by the injection signal generating means, and a second period that is determined while the engine is running and starting at a time corresponding to when the reference position signal is generated and ending upon generation of the top dead center signal by the top dead center signal generating means, said first period and said second period being measured based on the crank angle signal from the crank angle signal generating means.

3. An injection timing measuring device according to claim 2, wherein the reference position on the crank shaft is within a range of 30° CA to 90° CA advanced from the top dead center position.

4. An injection timing measuring device according to claim 2, wherein measurement of the first and second periods is started at generation of a crank angle signal immediately following the generation of a reference position signal.

5. An injection timing measuring device comprising:

crank angle signal generating means for generating a crank angle signal during each increment of a predetermined crank angle that indicates a rotational angle of a crank shaft;

reference position signal generating means for generating a reference position signal at a predetermined timing prior to fuel injection from an injection valve provided in an engine, the reference position signal corresponding to a reference position on a crank shaft;

injection signal generating means for sensing the actual time of when the injection valve injects fuel and generating a corresponding injection signal;

top dead center signal generating means for generating a top dead center signal when a piston reaches a top dead center position; and fuel injection timing calculating means for calculating a fuel injection timing relative to the top dead center position based on a first period starting at a time corresponding to when the reference position signal is generated by the reference position signal generating means and ending upon generation of the injection signal by the injection signal generating means, and a second period starting at a time corresponding to when the reference position signal is generated and ending upon generation of the top dead center signal by the top dead center signal generating means, said first period and said second period being measured based on the crank angle signal from the crank angle signal generating means, wherein measurement of the first and second periods comprises counting crank angle signal pulses and determining a fraction of one crank angle signal pulse,-the fraction being determined as a proportion of the length of the fraction to a length of at least one pulse interval of crank angle signals.

6. An injection timing measuring device according to claim 5, wherein said proportion is determined based on a first count provided during at least one pulse interval of crank angle signals after generation of the reference position signal by a counter and a second count provided by the counter during the period of the fraction, said counter being started by a crank angle signal pulse.

7. An injection timing measuring device according to claim 2, wherein, if rotational speed of the crank shaft exceeds a predetermined value, a number of crank angle signals counted per rotation of the shaft is divided so that a divided value is used for the calculation performed by the injection timing calculating means.

8. An injection timing measuring device according to claim 2, wherein measurement of an injection period is performed a plurality of times during one rotation of the crank shaft, and a greatest measurement obtained during said measurement is determined as a main injection period.

9. An injection timing measuring device according to claim 8, wherein an injection period measurement obtained prior to the greatest measurement of a plurality of measurements is determined as a pilot injection period, and wherein an injection period measurement obtained after the greatest measurement is determined as a secondary injection period.

10. An injection timing measuring device according to claim 2, wherein a level of the injection signal corresponds to opening of the injection valve, and wherein an injection period is measured starting from an injection start time at which the level of an injection signal exceeds a first predetermined criterion, and ending upon an injection end time at which the level of the injection signal falls below the first predetermined criterion.

11. An injection timing measuring device according to claim 10, wherein a plurality of criteria are used to determine the level of the injection signal so as to follow changes in opening of the injection valve over time.

12. An injection timing measuring device according to claim 10, wherein the first predetermined criterion for determining an event of fuel injection is corrected with a predetermined criterion based on a difference between a zero level and a peak level of the injection signal.

13. An injection timing measuring device according to claim 12, wherein the peak level of the injection signal is determined to occur if the level of the injection signal continues to be not lower than a second predetermined criterion that is greater than said first predetermined criterion for not shorter than a predetermined length of time.

14. An injection timing measuring device according to claim 10, wherein the injection valve is determined to be open if the level of an injection signal pulse continues to be higher than the first predetermined criterion for not shorter than a length of time determined according to the peak level of the injection signal pulse.

15. An injection timing measuring method according to claim 1, wherein the step of measuring a first period and the step of measuring a second period are started at an initiation of the reference position signal.

16. An injection timing measuring method according to claim 1, wherein the reference position signal and the crank angle signal are each produced by a different sensor.

17. An injection timing measuring device according to claim 2, wherein the first time period and the second time period start at an initiation of the reference position signal.

18. An injection timing measuring device according to claim 2, wherein the reference position signal generating means is different from the crank angle signal generating means.

* * * * *